(12) United States Patent
Bard et al.

(10) Patent No.: US 7,839,521 B2
(45) Date of Patent: Nov. 23, 2010

(54) METHODS AND SYSTEMS FOR PRINT JOB MANAGEMENT AND PRINTING

(75) Inventors: Bruce G. Bard, Voorhees, NJ (US); Jonathan Charles Dewees, Medford, NJ (US)

(73) Assignee: Global Print Systems, Inc., Marlton, NJ (US)

( * ) Notice: Subject to any disclaimer, the term of this patent is extended or adjusted under 35 U.S.C. 154(b) by 1460 days.

(21) Appl. No.: 11/199,855

(22) Filed: Aug. 9, 2005

(65) Prior Publication Data
US 2007/0035763 A1 Feb. 15, 2007

(51) Int. Cl.
*G06F 3/12* (2006.01)
*G06Q 20/00* (2006.01)
*G06Q 30/00* (2006.01)

(52) U.S. Cl. ......... 358/1.15; 399/79; 705/16; 705/26; 705/64; 705/77

(58) Field of Classification Search ....... 358/1.11–1.18; 709/217–219; 705/64, 67, 74, 77, 16, 402, 705/26; 399/79; 710/8
See application file for complete search history.

(56) References Cited

U.S. PATENT DOCUMENTS

| | | | |
|---|---|---|---|
| 5,930,810 A | 7/1999 | Farros et al. | |
| 6,064,838 A * | 5/2000 | Maruta et al. | 399/79 |
| 6,466,328 B1 | 10/2002 | Bradley et al. | |
| 6,615,234 B1 | 9/2003 | Adamske et al. | |
| 6,636,259 B1 * | 10/2003 | Anderson et al. | 348/211.3 |
| 6,748,471 B1 | 6/2004 | Keeney et al. | |
| 6,859,832 B1 | 2/2005 | Gecht et al. | |
| 6,992,787 B2 * | 1/2006 | Fredlund et al. | 358/1.15 |
| 7,013,288 B1 * | 3/2006 | Reifel et al. | 705/26 |
| 7,148,986 B2 * | 12/2006 | Sandfort et al. | 358/1.15 |
| 7,180,622 B2 * | 2/2007 | Cooper | 358/1.15 |
| 7,190,475 B2 * | 3/2007 | Nomoto | 358/1.15 |
| 7,274,481 B2 * | 9/2007 | Kawaoka et al. | 358/1.15 |
| 7,301,663 B2 * | 11/2007 | Ferlitsch | 358/1.15 |

(Continued)

FOREIGN PATENT DOCUMENTS

EP 1120701 A1 1/2001

(Continued)

OTHER PUBLICATIONS

"Instant Print Station—Photo Kiosk Software", http://www.storefront.com/photo_kiosk_ips.html, printed on Apr. 13, 2005, 3 pages.

(Continued)

*Primary Examiner*—Kimberly A Williams
(74) *Attorney, Agent, or Firm*—Pepper Hamilton LLP (57) ABSTRACT

A print system may include a job management server and a plurality of print stations. The job management server may receive, from a first network, a print stream that is representative of a document or graphic. The print stations may be located remotely from the job management server and may be in communication with the job management service via a second network. The job management server may deliver a copy of the print stream to one of the print stations for printing when a user who is authorized to access the print stream enters identifying information and selection data at the selected print station.

14 Claims, 4 Drawing Sheets

U.S. PATENT DOCUMENTS

| | | | |
|---|---|---|---|
| 7,388,859 B2 * | 6/2008 | Wells et al. | 370/352 |
| 7,515,180 B2 * | 4/2009 | Wada | 348/231.2 |
| 7,528,976 B2 * | 5/2009 | Hart et al. | 358/1.15 |
| 7,557,950 B2 * | 7/2009 | Hatta et al. | 358/1.9 |
| 2002/0026379 A1 | 2/2002 | Chiarabini et al. | |
| 2002/0078160 A1 * | 6/2002 | Kemp et al. | 709/208 |
| 2002/0087622 A1 * | 7/2002 | Anderson | 709/203 |
| 2002/0097417 A1 | 7/2002 | Chang et al. | |
| 2002/0116278 A1 * | 8/2002 | Meyer et al. | 705/26 |
| 2002/0120506 A1 * | 8/2002 | Hagen | 705/14 |
| 2002/0169002 A1 | 11/2002 | Imbrie et al. | |
| 2002/0184497 A1 * | 12/2002 | Gage et al. | 713/168 |
| 2002/0186408 A1 | 12/2002 | Nakaoka et al. | |
| 2002/0196452 A1 * | 12/2002 | Komiya | 358/1.1 |
| 2003/0038835 A1 * | 2/2003 | DeFelice | 345/738 |
| 2003/0090705 A1 * | 5/2003 | Ferlitsch | 358/1.15 |
| 2003/0093490 A1 | 5/2003 | Yamamoto et al. | |
| 2003/0101342 A1 | 5/2003 | Hansen | |
| 2003/0105643 A1 | 6/2003 | Chen et al. | |
| 2003/0179405 A1 * | 9/2003 | Seto | 358/1.15 |
| 2003/0182438 A1 | 9/2003 | Tenenbaum | |
| 2003/0220994 A1 * | 11/2003 | Zhu | 709/223 |
| 2004/0042592 A1 * | 3/2004 | Knott et al. | 379/88.16 |
| 2004/0172440 A1 * | 9/2004 | Nakajima et al. | 709/200 |
| 2004/0184074 A2 | 9/2004 | Leiman et al. | |
| 2004/0213612 A1 | 10/2004 | Hanaoka | |
| 2005/0071519 A1 * | 3/2005 | Hart et al. | 710/8 |
| 2005/0206943 A1 * | 9/2005 | Fukuda | 358/1.14 |
| 2005/0265766 A1 * | 12/2005 | Ohmura | 400/62 |
| 2006/0044590 A1 * | 3/2006 | Ferlitsch et al. | 358/1.14 |
| 2009/0076964 A1 * | 3/2009 | Jackson et al. | 705/52 |

FOREIGN PATENT DOCUMENTS

| | | |
|---|---|---|
| JP | 2004-078767 | 3/2004 |
| WO | WO 98/40826 | 9/1998 |
| WO | WO 02/48855 A1 | 6/2002 |

OTHER PUBLICATIONS

What is PrintMe?, http://www.efi.com/products/printme/index.html, printed on Apr. 13, 2005, 2 pages.

"Print on demand", http://en.wikipedia.org/wiki/Print_on_demand, printed on Jul. 5, 2005, 2 pages.

"Print on Demand", http://www.sfwa.org/beware/printondemand.html, printed on Jul. 5, 2005, 9 pages.

"An Incomplete Guide to Print-on-Demand Publishers", http://www.booksandtales.com/pod/podpublish.htm, printed on Jul. 5, 2005, 10 pages.

"PrintStation Kiosk, Product Overview, Winter 2005", GlobalPrint Systems, Inc., dated May 11, 2005, 19 pages.

* cited by examiner

METHODS AND SYSTEMS FOR PRINT JOB MANAGEMENT AND PRINTING

TECHNICAL FIELD

This document generally describes document storage, retrieval and/or printing services and systems.

BACKGROUND

Today, the timely delivery of electronic information has become increasingly important to the core operations of many businesses in the global market. Many companies have expanded their operations throughout the world, and as a result, rely on the ability to transmit information from one place to another in a short period of time.

With the enormous capability of computer networks to communicate information between remote locations, business travelers continue to depend on these networks for the delivery and receipt of information while on the road. Furthermore, not only is the capability to deliver electronic information important to a business traveler, but so is the ability to access and print that information at a convenient location. For instance, a business traveler in a hotel may need to print an electronic mail message, correspondence, presentation, or other documents from his or her laptop while on travel. In order for the business traveler to obtain a hard copy of the document, he or she may have to print it to the hotel's printer. With the present technology, the business traveler would have to take several steps before a document may be delivered from the laptop to the hotel's printer. For instance, in one situation the traveler may have to first obtain the network identification of the printer and information about the type of printer, and configure the laptop to connect to the printer before printing may occur. Alternatively, the traveler must provide the hotel staff with a disk, memory stick, key or other file storage medium containing the document. This results in time delays based on the availability of hotel staff, as well as security and privacy issues due to loss of control over the file. Further, if a document has been prepared using specific software and the hotel's computer does not have that software or the latest version of the software, then the document may not print, or it may print in a different format or quality than that to which it was originally created.

Many businesses today transmit information through electronic mail. Sending electronic information over the Internet has become increasingly prominent in even the basic operations of many corporations. However, the use of email for delivering information could be problematic, as email is usually produced in an ASCII based format that is not compatible with many other forms of complex documents. Furthermore, the delivery of information through email requires the recipient to possess an email account and the necessary application on his computer in order to load, view, and/or print the document. Finally, security and privacy issues also arise in this context, as the delivery of a file to hotel staff by email can result in hotel staff having access to confidential, personal or otherwise sensitive information.

Although many companies typically transmit information electronically, it is often more desirable to business travelers to receive such information in hard copy form. Currently, there are several methods for delivering hard copy information, including Express Mail, Federal Express, and UPS. However, these types of services have many drawbacks. For instance, a recipient may have to schedule a time for pick-up that may not be convenient during travel, delivery of the document may be delayed, the document may be lost in the process of delivery, the recipient has to wait a period of time for the document to be delivered, the document may be damaged if not packaged properly, and the cost for prompt or overnight delivery is high.

Current methodologies for transmitting and printing information have already been introduced into the marketplace, such as those developed by Gecht et. al (U.S. Pat. No. 6,859,832), Bradley et. al (U.S. Pat. No. 6,466,328), and Adamske et. al (U.S. Pat. No. 6,615,234). However, these prior systems usually require the recipient to have a computer and the appropriate application to receive, view, and load a document. Furthermore, these prior art systems may not be able to provide security for the data during transmission. In addition, these prior art systems may not be able to provide high quality color or black and white printing of the data. Other systems, such as that described in Keeney et al. (U.S. Pat. No. 6,748,471), require the user to recall a document-specific identification code, and they plug into existing hotel printers and thus require knowledge of specific printer capabilities. In addition, they do not solve the problem of security.

Thus, there is a need in the art for an improved remote document, storage, access, printing and/or system. This document describes attempts to solve one or more of the above-listed problems.

SUMMARY

In an embodiment, a printing system includes a job management server that receives data from a first network and communicates with many print stations located remotely from the server. The server then delivers data to one of the print stations for printing when a user who is authorized to access the print stream enters appropriate information at the print station location.

In some embodiments, the job management server may include a database of multiple print streams that remain in the database for a certain period of time, even after a print stream is transmitted to and printed at a print station. Therefore, a user may reprint the data after the first printing occurred, as long as the print stream continues to remain in the database.

The print stream may be compressed and/or encrypted when stored in the database and delivered to a print station. The print station may then decompress and decrypt the print stream prior to printing the data. The format of the print stream may be universal or otherwise in a format that is recognized by the print station printers. Therefore, any type of document may be printed from the print stations.

In some embodiments, the print stations may have a parameter monitoring system that alerts a remote monitoring system when the stations are not operating normally, such as low toner, low paper levels or other critical or non-critical alerts.

In another embodiment, a method for printing a document includes receiving, by a management server, a print stream data in a print stream format. The print stream data corresponds to one or more documents, is associated with a user, and may be stored in a database of the job management server. When a user enters user identification and the system verifies that information, the print stream is then delivered to a print station. The user may be presented with a menu of documents that are stored in the database by the job management server.

The print stream corresponding to a selected document may continue to remain in the database for a predetermined period of time even after printing has occurred. A user may reprint the data while the print stream still remains in the database.

In some embodiments, the print stream data stored in the database may be compressed and/or encrypted by the job management server. After the compressed and encrypted data may be delivered by the server to a print station, the data is decompressed and decrypted at the print station prior to printing.

DETAILED DESCRIPTION

Before the present method and system are described, it is to be understood that this disclosure is not limited to the particular methodologies and systems described. It is also to be understood that the terminology used in the description is for the purpose of describing the particular versions or embodiments only, and is not intended to limit the scope.

It must also be noted that as used herein and in the claims, the singular forms "a," "an," and "the" include plural references unless the context clearly dictates otherwise. Thus, for example, reference to a "print station" is a reference to one or more print stations and equivalents thereof known to those skilled in the art, and so forth. Unless defined otherwise, all technical and scientific terms used herein have the same meanings as commonly understood by one of ordinary skill in the art. Although any methods, materials, and devices similar or equivalent to those described herein can be used in the practice or testing of embodiments of the invention, the preferred methods, materials, and devices are now described. All publications mentioned herein are incorporated by reference. Nothing herein is to be construed as an admission that the invention is not entitled to antedate such disclosure by virtue of prior invention.

Figure 1:
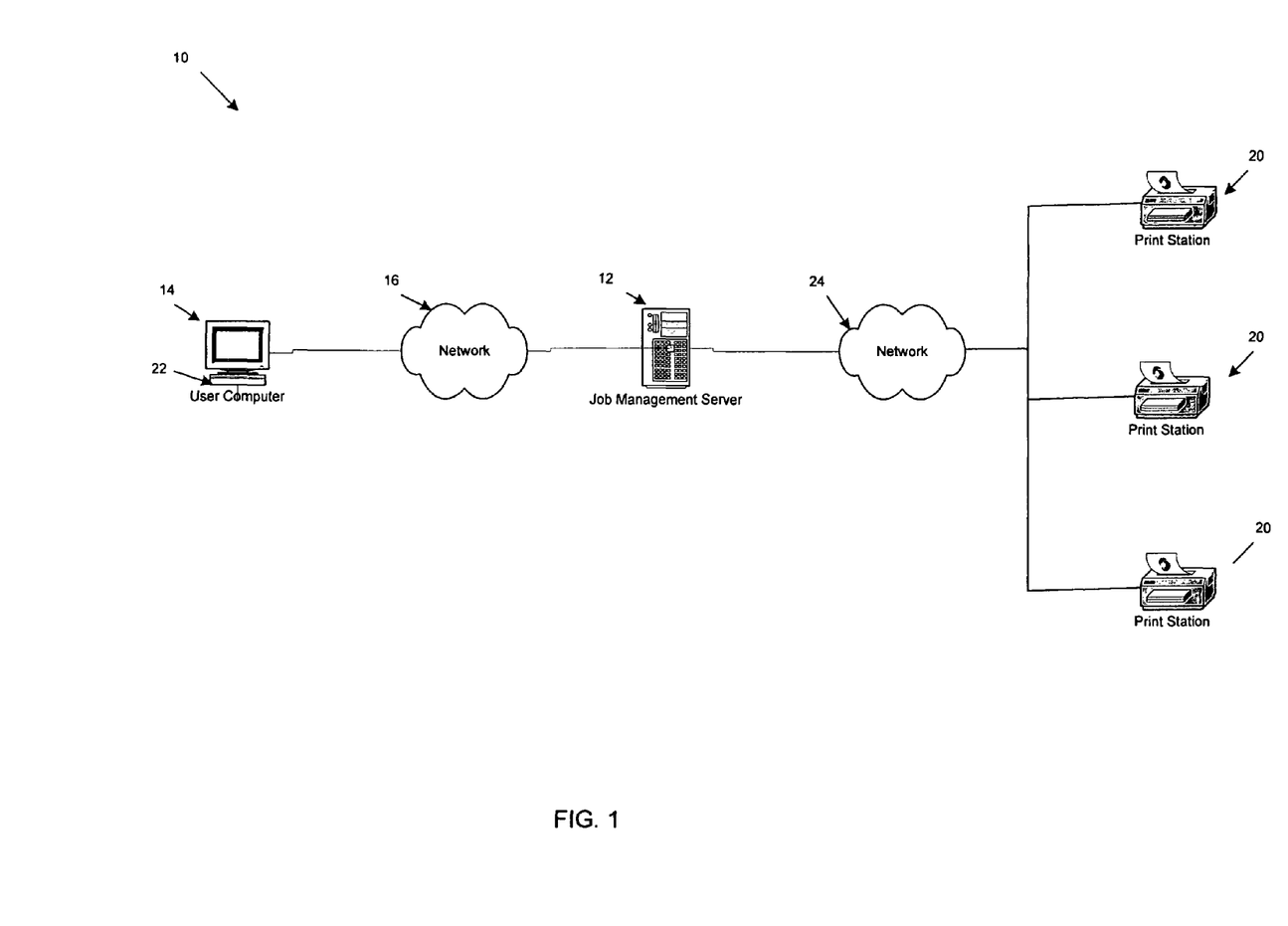
FIG. 1 is a block diagram of an exemplary document management and printing system.

Referring to FIG. 1, in an embodiment a print station system 10 may include one or more of the following elements: a job management server 12, one or more user computers 14 that communicate with the job management server 12 via a communications network 16, and any number of print stations 20 that communicate with the job management server 12 via a communication network 24. The job management server 12 may be any device, or program or combination that is capable of storing a document file and communicating that file to other devices via a communication network. For example, job management server 12 may include a computer having a software program that provides services to other computers. The communications networks 16 and 24 may be the Internet, an intranet, a local area network, a wide area network or any communication system over which a file may be transmitted. Communications networks 16 and 24 may be different networks, or at least a portion of the same network, and may change over time. The print stations 20 may include any kiosk, terminal or device through which a user may request a document from the job management server 12 and at which the document will print. User computer 14 may be any electronic device from which a document file may be uploaded to the job management server 12, such as a desktop computer, laptop computer, personal digital assistant, cell phone, file storage device such as a memory stick or universal serial bus (USB) memory device, media player or other device.

In various embodiments, user computer 14 may include a print driver 22 that provides a transport mechanism to transfer data from the user computer 14 to the job management server 12 for future output printing at a print station 20. The print driver 22 may be designed to allow any user, such as a user of a computer having a Windows, Linux, Apple or other operating system, to "virtually" print documents, photos, graphics, contents of a window such as a web page, or other material, each of which is referred to herein as a "document," from any software application that provides the option to print a document. With the print driver 22 installed in the user computer 14, when a user selects a print option from the print menu on the user computer 14, the user may choose the job management server 12 as a device that will receive a print job. The print driver 22 will then convert the document to a print stream format that is recognized by the print stations 20, and it will deliver the converted print job to the job management server 12 for storage and further routing.

In some embodiments, the print driver 22 may function in a manner similar to one or more other print drivers currently installed on the user's computer 14 that print documents to a locally attached printer. Upon successful login, the print job may be converted to a Postscript or other print stream format compatible with the printers of the print stations or kiosks 20. The print stream may be compressed and/or encrypted, and then transmitted to the job management server 12, where it may be stored in a database with data connecting it to the user, such as a Print Job Record, for future retrieval and printing at a print station 20 (or any other output device).

In some embodiments, before uploading the print job to the job management server 20, to ensure that the user is authorized to send documents to the job management server 12, the user may be prompted to provide authentication information such as an account number, account password, customer name and/or any other combination of information previously provided by the customer. In addition, the system may require or permit the user to select from several printing options which may include any or all of the following: page orientation, color/black and white print quality, paper type, paper size or any other printing parameters in some embodiments. If the customer fails to choose any of these parameters, the system may select a parameter as a default.

In some embodiments, when a print job is being spooled to the server 12, a print port monitor may continually or periodically check for a connection between the user computer 14 and the communications network 16 until a connection exists or until the customer cancels the print job from the print spool. When there is a successful connection, the job management server 12 or user computer 12 may check the customer's information such as account number and/or password for validation before spooling the print job. If validation fails, the user computer 14 may display a dialog box requesting the user to re-enter validation information such as account number and/or password. This process of validation may be repeated until the system successfully validates the customer's information or until the job is canceled. In the alternative, the validation process may be repeated for a limited number of times, after which the system may block the user from further attempts.

After successful validation, the print stream may be retrieved from the print spooler, and linked with a unique identity file for the user. The print stream may then be compressed and encrypted using an encryption key from the identity file. The print job may then be sent to the job management server 12, and a dialog box indicating the progress of transmitting the print job to the server 12 may be displayed on the user computer 14. Optionally, the displayed dialog box may also indicate that the upload process requires a certain fee. Other optional calculation of charges may be displayed or occur as well. In some embodiments, an option to cancel the transaction may also be provided in the dialog box.

If the print job is interrupted for any reason before the print job is completed, such as due to Internet connection failure, in some embodiments the user computer 14 may display a failure message in a dialog progress box with a "re-try" or "cancel" print job option. If the user chooses the cancel option, then the print job may be permanently deleted from the spooler. While the print job is being sent, the print port monitor may continuously or periodically check for communication network 16 connection to the server 12 until connection exists or until customer cancels the print job from print spool.

The print job may be sent to the server 12 by any suitable method, such as file transfer protocol, packet communication, email, virtual fax number, universal messaging or other delivery mechanisms and methods.

Upon successfully sending the print job to the job management server 12, customer may receive an acknowledgement from the job management server 12, and/or the customer may receive a message indicating that the print job was successfully sent. In addition, the server 12 may indicate to spooler that the print job is completed, so that the user computer 14 will know that the print job may now be purged from the spool.

The job management server 12 is the central hub of the printing station system and may be responsible for many functions in some embodiments. For example, the server 12 may receive print jobs from customers or other user via the print drivers 22 installed on one or more user computers 14. The server 12 may then store these print jobs for future retrieval and output printing at print stations 20. Other functions that the job management server 12 may perform include any or all of the following: (1) provide security for a customer's data by validating the customer's account prior to allowing access to the system; (2) manage the data transmission and storing process by receiving the print jobs from user computers 14 via the print driver 22 and subsequently storing the print jobs for later retrieval; (3) manage the printing of data on print station or kiosks 20 when requested by a customer at a print station 20; (4) manage customer account balances by performing functions such as estimating the costs of the print jobs and requesting payment of funds from customer or charging customer's credit card shown on customer's account; (5) transfer the print stream to the print station 20 for output printing; and (6) communicate with specific print stations 20 as well as other devices on the network of the system to check on the health and status of each print station 20. For instance, if a print station is low on toner or not functioning properly, the server 12 may send a message indicating that a service person should attend to that particular station or kiosk 20 to cure the problem, or in some embodiments the server 12 may communicate to that station or kiosk 20 to automatically replace the low toner with another new toner cartridge which may be stored in the kiosk.

Upon successful receipt of a print job package, the server 12 may create a job record in a job management database for the customer's data. In some embodiments, the server 12 may perform some or all of the following functions: decrypt the print stream package; decompress the print stream package; charge the applicable customer account for a cost of the upload (such as on a document-based or per-page basis); suspend the print job if customer has not yet paid a balance on the account; send an email notifying the customer that the account is deficient and that the print job is suspended; and/or direct the customer to a website, help desk or other center in order to solve any problems with the customer's account or printing jobs.

To help provide security, in some embodiments the print job package may be encrypted using any suitable encryption technology, including those now existing and those that may be developed in the future. The job management server 12 and/or the print station 20 may contain software that enables decryption of the print job package before printing. Other security systems may include requiring the user to enter or provide a password, biometric identifier (such as a fingerprint or retina scan), access code or other security measure before allowing the user to retrieve a print job.

The print stations 20 produce the hard copy of the data. The print stations 20 may be conveniently located in public venues such as hotel lobbies, hotel business centers or airport terminals as well as in other locations where business travelers and/or the general public may congregate, thus allowing users to easily access a printing station to print documents from their portable computing devices while out of the office and on the road.

Figure 2:
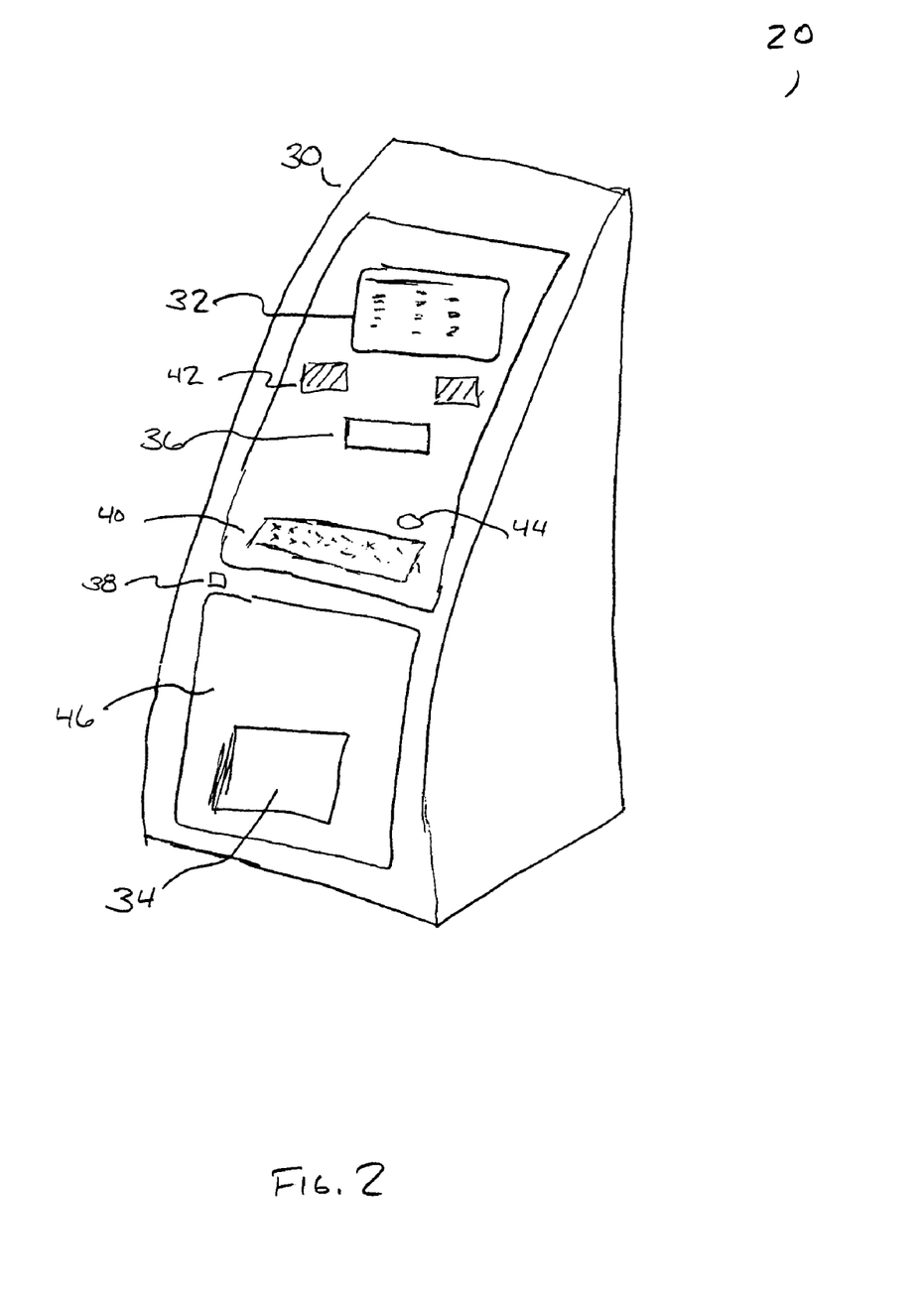
FIG. 2 illustrates an exemplary print station.

Referring to FIG. 2, each print station 20 may include any or all of the following components: (i) a physical walk up kiosk housing containing a computing device; (ii) a screen or monitor 32 optionally with touch screen input capability; (iii) a printer 34, such as a high capacity, low maintenance and high quality color laser printer (such as one having approximately 2,100 page paper capacity); (iv) a print job output tray 36, an exposed USB or other port 38 for optional file input; an input device 40, such as a keyboard and/or a trackball; and (v) audio input/output equipment such as one or more speakers 42 and an audible microphone 44. Optionally, the print station 20 will include a front or side access panel 46 or door, through which paper, toner and other required items may be supplied.

A print station 20 may contain many software and web applications. The print station's applications, printer and internal computer may be contained in a housing 30 that is locked down so that the interior elements of the print station may not be exposed or accessed by customers or unauthorized persons. The majority of the processing may be server based, and in some embodiments the print station 20 may be dedicated to the job management server 12. However, due to the rich application functionality required, other software applications may be included to deliver additional functionality for the print station or its computer.

One of the print station's applications may provide a main menu with several choices for the customer. For instance, the menu may provide the customer with the option of selecting "My PrintStation Queue" that allows the customer to access a list of print job(s) previously requested by the customer. The customer may then select which job(s) to print at the kiosk 20. Print jobs may be divided into two categories: "pending" and "completed." There may be additional options on the menu for received faxes and other print tasks.

In some embodiments, the kiosk 20 may have a port 44 through which a user can insert a USB data stick or drive, navigate the folders and files on the USB data stick, and select a document to be printed at the print station. Other optional applications that may be featured at the print station may permit the user to print airline and train boarding passes and/or tickets.

The print station 20 may include one or more features to help provide security. For example, the print station 20 may include a video or still camera to gather visual images of users who access the print station. The images may simply be stored in memory to be visually reviewed at a later date if suspicious activity is believed to have occurred as a print station (such as would occur in known camera-based security systems). Also, the images may be stored in a database and matched against known images using any suitable pattern recognition technology to further verify a user's identity by determining whether the visual image matches an expected image in the database. This verification may be performed before a user is permitted to access the system, and/or it may be an option that can be performed for forensic purposes after users access the print station. Such applications may be useful in environments such as secure environments or closed network, such as individual corporations, or locations having national security-related concerns.

The print station 20 may include other secure features such as a housing 30 that is partially or fully made of radio frequency-resistant alloys to resist remote detection. For example, the housing may include a copper mesh and/or polymer coating with magnetically-charged iron particles to inhibit access or interference from external signals. The print station 20 may also include one or more biometric inputs, such as a retina scanning device or a fingerprint collection device, to collect biometric information from a user and compare that information to a database of known biometric information for authorized users.

In addition, the print station 20 may be equipped with one or more features to allow detection of an original document versus a copy. For example, the print station may use magnetic ink character recognition (MICR) toner, which contains iron oxide or other particles in a suitable percentage, such as about 50% to about 60%, and one or more print heads that allow printing with a distribution of the particles in a pattern that may be recognized by electronic processing equipment.

The print station may also print using random letter slices, or very small blank lines or patterns through printed areas in predetermined locations. For example, the system my perform this by capturing a spool file and scanning for text, generating random lines constrained to fall within the boundaries of text when text is found, draw the lines (such as by using PostScript commands) using the background color of the text, recording coordinates of lines draw, and sending the modified spool file to the printer. Alternately, the system may look for graphics and similarly insert lines or slices into certain portions of the graphic item. Optionally, the slices may be inserted in a pattern that is specific to a particular document. The pattern may be stored in a memory along with the associated document, print location, print station user and/or print time so that a person or machine may later view an original or photocopied document, identify the slice pattern, and compare it to slice patterns in the database to determine where, when or by whom the original document printed.

Figure 3:
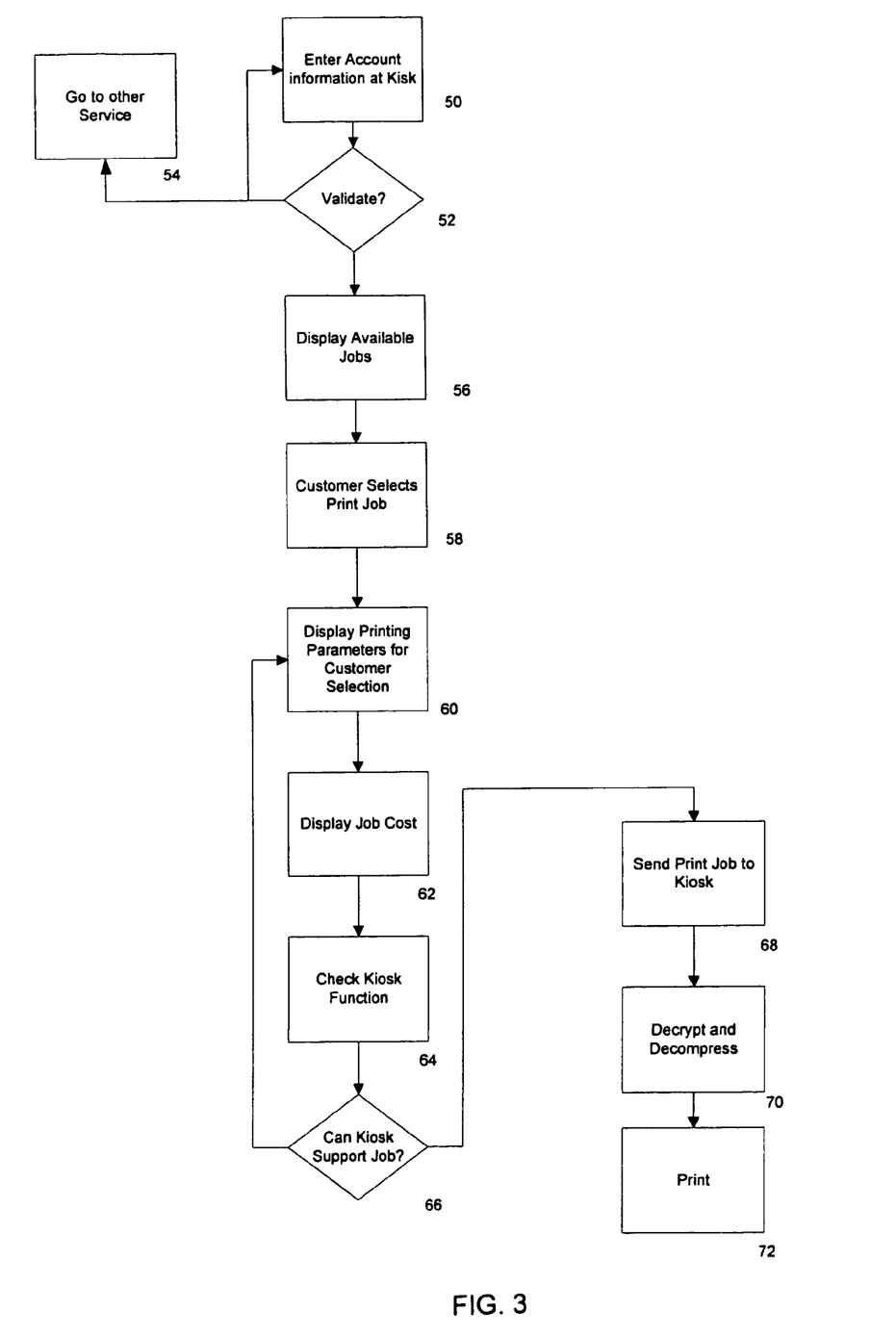
FIG. 3 is a flowchart of an exemplary print job management process.

When a customer wishes to print a document from a print station, the customer may walk up to any print station and touch the screen, keyboard or another input device, or use other activation systems such as speech recognition, to use the print station. FIG. 3 illustrates various steps that may be followed in an exemplary process. A login dialog requesting identification information such as customer account number and password may appear on the screen. After the appropriate information is entered 50 by the customer, the kiosk application may send a request to the job management server to validate 52 the customer account number and password. If validation fails, a message to re-enter 50 customer account number and password may be displayed on the screen of the kiosk. If validation continues to fail, the kiosk may display a message directing 54 the customer to a website or service website for account and password assistance, and/or the system may freeze the account or kiosk after a predetermined number of unsuccessful logins. Other help and tutorial options may be available at the kiosk in some embodiments.

Upon successful login, several options may be displayed on the screen. One option may be a "My PrintStation Queue" which, if selected, may display 56 a list of print jobs that have been uploaded to the job management server for the customer's account. Thus, the kiosk may request the job management server to display the pending print jobs. The list of print jobs may be displayed in any suitable format, such as in a scrollable, row and column list window. The customer may then select 58 a print job from the queue list to be printed. After selecting the print job to be printed, in some embodiments one or more printing parameters to be selected by the customer may be displayed 60 on the screen. These parameters may include any or all of the following: color, black and white, grayscale, number of copies to be printed, and/or duplex or other parameters. Before printing the document, the customer may select or change the printing parameters at any time. After the customer selects the desired parameters, the customer may then select a "Print" option to start printing the document.

In some embodiments, the total number of pages printed and the total cost of the print job may be calculated based on the options and parameters selected by the customer. The screen may display 62 the total cost of the print job for user to confirm. In some embodiments, if the customer account balance is zero or less than total cost of print job and/or if the customer has an unsatisfactory payment history, the kiosk may prompt the user to recharge its account or pay by credit card. If customer account is not deficient and validation is successful, the server then sends the data to the print station and marks the print job as "Ready for Printing." After the data is decompressed and decrypted for printing by the print station, the server may re-compress the data and store the data package in the job record for any future re-printing.

Optionally, in embodiments that use an input port (element 44 in FIG. 2), the system may also permit printing of documents that are loaded directly to the print station from a disk, USB device or other storage media. In such embodiments, the print station must be equipped with appropriate document management software to accept the file, format it and generate a print stream for printing by the printer.

The operation of each print station may be constantly or periodically monitored 64 by the job management server or another monitoring system to ensure that it is properly functioning. If, for instance, the system determines 66 that a print system kiosk does not have enough supply of paper and/or toner to produce a high quality document for a particular print job, the screen may display the number of copies the print station's supply can support, request the customer to change the printing parameters, request the customer to re-submit the print job request, or direct the customer to another nearby kiosk. If the kiosk can successfully support the print job, then the job management server may send 68 the print job to the kiosk. When the print job arrives, the data package may be decrypted, decompressed, and/or ready to be printed 70. Then, the print job may be printed 72 at the printer. In some embodiments, in addition to the print stations or kiosks, the system may allow users to log in and access a print job from any computer so that the job can be printed to an attached printer.

Because the system delivers document files in recognized print stream formats, the print station will be able to print documents authored by any software program, so long as the document has been "printed" to the job management server using the recognized print stream format. However, in other embodiments the documents may be delivered to the print station in another common format, such as portable document format, and a print stream may be created using a print driver at the print station.

If the print job fails, in some embodiments a failure message may be sent to the server, and information about the failure may be displayed on the print station screen to notify the customer of such failure. The job management server may initiate a service request for that particular kiosk or may send a service person to that kiosk to fix the problem. If the print job is successful, customer may retrieve the printed hard copy from the kiosk. An acknowledgement of the successful printing with information relating to the number of pages printed, or the cost of the job may be sent to the customer. A message that the print job is completed may be sent to the kiosk.

The customer account balance may be updated by job management server after each print job is successful. If a request from kiosk is received indicating the print job is successfully completed, the server may calculate the final print job cost, update the customer account balance to reflect the cost, retain the history record, and move and store the print job package to the history record in the database. Optionally, the print job may continue to be stored by the job management server for a predetermined time period, such as seven days, one month or until deleted by the user. Also, if a request from a print station is received indicating that the print job failed, the job management may continue to keep the print job package active in the system for future printing.

Figure 4:
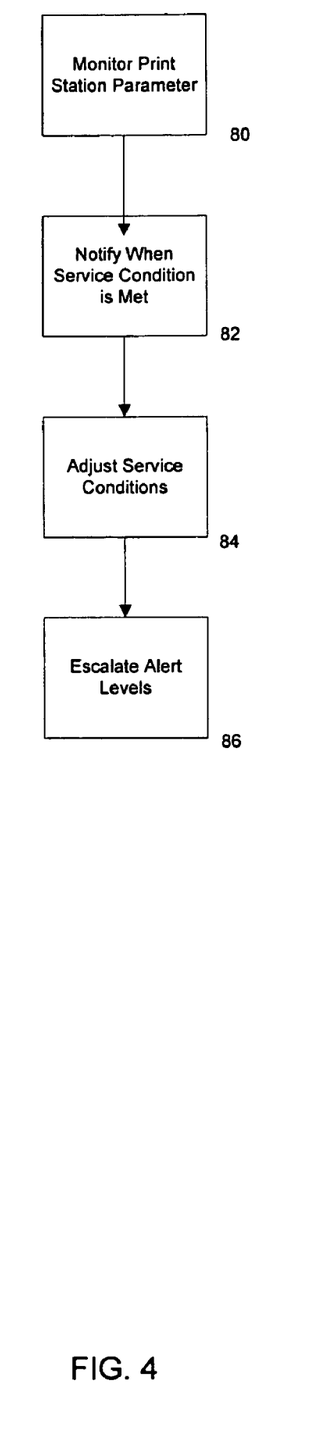
FIG. 4 is a block diagram of an exemplary print station monitoring method.

In some embodiments, the system may include a print station parameter monitoring system. Referring to FIG. 4, the system may monitor 80 parameters for the print station such as toner level, paper level, paper jam, power failure and other aspects that may indicate that service is or will be required. If the parameter is found to be within a service level, the print station monitoring system may notify 82 a remote monitoring system that service is required. For example, if the paper level is below fifty percent, the remote system may be advised to dispatch a technician to refill the paper soon. The specific levels may vary by print station, and in some embodiments the print station monitoring system will adjust 84 the service conditions based on actual usage of the kiosk. Also optionally, alert levels may escalate 86 after hitting various parameters, such as "paper 50% empty," "paper 60% empty," "paper 70% empty" and so on.

The disclosed embodiments relate to methods and systems for remote printing which operates within a communications network environment, such as the Internet. In some embodiments, users may use both the user computer and the print station to access the job management server via a website or websites. The print station's website may serve as a marketing and customer service site, and it may also direct prospective customers who are interested in using the print station system to the account management setup process. In the account management setup process, new customers may be guided through one or several new account data entry screens or forms, and upon successful account setup they may be provided with installation services or software in order for the print station's print driver to be installed on the customer's local computer such as a laptop or another type of portable computing device.

Prior to printing from a print station, first time users may need to establish a valid account. The account setup process may include, among other things, entering a valid credit card, establishing a positive account balance in the system and downloading or installing the print station's print driver on the user's computing device.

When the user creates an account, the user may be prompted to provide any or all of the following information: user's name, company, address, telephone number, fax number, email address, and/or the type of account desired (i.e., business or personal). After the user provides the appropriate information, the system may create a unique account number and password for the user. An account record for the user may also be created and stored in the system's database. Other information about the user may be requested during this new account set-up process. For example, such information may be related to the user's form of payment, i.e. credit card or debit card. For instance, if the user wishes to pay for the printing services with a credit card, the system may request the user's credit card billing name and/or company name, user's personal credit card number or company's credit card number, the credit card security code, and or the billing address of the credit card owner. The system may also create an account balance form that may display the customer's usage profiles and the amount to be charged on the customer's credit card for the printing services. In addition, for security the system may require biometric information from the user, such as a fingerprint or retina scan, which may then be used to verify user access of print stations. A photograph of the user may also be gathered to allow for visual verification of the user at the print station.

Before providing the user with the option to download and install the print station's print driver onto the user's computer, the system may need to validate the customer's credit card information or other billing information with the credit card company, bank or other financial institution. If the customer's financial information is validated, the customer may continue to the next step by downloading and installing the print driver. The customer may also download the customer's unique identity file which may contain customer's information. If, due to some technical problem, the print driver fails to be downloaded and installed onto the customer's computer, a message may be sent to the job management server indicating the status of the download and installation. A dialog box indicating this failure may be displayed on the customer's computer, and the customer may be directed to a website, phone service or other system for technical support and subsequent print driver download.

In order for the customer to pay for the printing services, the system may require authorization of payment from the customer. If authorization fails due to customer account problems, the system may send an email to the customer indicating that a problem has been encountered and requesting the customer to visit a website, phone service or other system to rectify the problem by providing certain information such as updating the account with the proper credit card information or providing a new credit card. If authorization is successful, the balance will be charged on the customer's credit card, and the customer's account balance form will be updated accordingly. After an account is set-up, the system may send an email to the customer confirming successful account setup along with the customer's account number and the amount charged to the customer's credit card. The system may send another email to customer with the customer's private password to the print station account.

It will be appreciated that variations of the above disclosure and other features and functions, or alternatives thereof, may be desirably combined into many other different systems or applications. Also, various presently unforeseen or unanticipated alternative, modifications, variations or improvements therein may be subsequently made by those skilled in the art which are also intended to be encompassed by the following claims.

What is claimed is:

1. A printing system, comprising:
   a job management server that receives, from a first network, a print stream that is representative of a document or graphic;
   a plurality of print stations located remote from the job management server and in communication with the job management server via a second network; and
   a computer-readable storage medium in communication with the job management server, wherein the computer-readable storage medium comprises one or more programming instructions for:
   receiving a print stream corresponding to one or more documents wherein the print stream is associated with a user,
   storing the received print stream in a database,
   debiting an upload cost from a print service account balance associated with the user when the print stream is received by the job management server,
   receiving, via a print station, user identification information,
   verifying the user identification information,
   receiving a selection of a document from the print station,
   in response to verifying the user identification and receiving a selection, delivering a copy of the print stream corresponding to the selected document to the print stations for printing,
   determining a cost of printing the selected document,
   if the print service account balance is less than the cost, prompting the user to recharge the print service account balance, and
   if the print service account balance is greater than the cost, debiting the cost from the print service account balance.

2. The system of claim 1, wherein the print stream remains in the database for a predetermined period after the print stream is printed at the print station.

3. The system of claim 1, wherein the print stream is compressed and encrypted when stored in the job management server and delivered to the print station, and wherein the print station includes one or more decompression and decryption modules for decompressing and decrypting the print stream.

4. The system of claim 1, wherein:
   the print stream is in a print stream format that is recognized by a printer at the print station; and
   the print stream was created using a print driver located on an electronic device located on the first network.

5. The system of claim 1, wherein the first network and the second network comprise at least portions of the same network during a period of time.

6. The system of claim 1, wherein each print station comprises a printer; and
   printing of the print stream is permitted only at the printer of the selected print station after user authentication.

7. The system of claim 1, wherein the print station is dedicated to the job management server.

8. The system of claim 1, wherein the print station includes a parameter monitoring system that is in communication with a remote monitoring system.

9. The system of claim 8, wherein the parameter monitoring system notifies the remote monitoring system or a user of the print station when a service level alert condition is met.

10. The system of claim 1, wherein:
    the job management server monitors usage patterns of the print station; and
    the system adjusts one or more service level alert conditions for the print station based on the usage patterns.

11. The system of claim 1, wherein the print station includes a port that accepts a file storage device.

12. The method of claim 1, further comprising:
    determining, by the print station, whether the selected document is an original document.

13. The method of claim 1, further comprising:
    presenting, to the user at the print station, the cost of printing the selected document.

14. The method of claim 1 wherein the cost is based on one or more of the following:
    number of pages,
    number of copies, and
    a color print.

* * * * *